(12) United States Patent
Okanobu

(10) Patent No.: US 6,714,600 B1
(45) Date of Patent: Mar. 30, 2004

(54) RECEIVER

(75) Inventor: Taiwa Okanobu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/332,717

(22) Filed: Jun. 14, 1999

(30) Foreign Application Priority Data

Jun. 16, 1998 (JP) .......................................... P10-167886

(51) Int. Cl.$^7$ .......................... H04L 27/06; H04B 1/69
(52) U.S. Cl. ...................................... 375/316; 375/130
(58) Field of Search ................................ 375/316, 147, 375/130, 345; 348/725, 731, 732, 554, 556, 733; 455/249.1, 251.1, 191.1, 191.3

(56) References Cited

U.S. PATENT DOCUMENTS

| | | | | |
|---|---|---|---|---|
| 6,148,008 A | * | 11/2000 | Okamoto | ..................... 370/486 |
| 6,307,599 B1 | * | 10/2001 | Komatsu | ..................... 348/725 |
| 6,317,168 B1 | * | 11/2001 | Seo | ............................. 348/554 |
| 6,334,217 B1 | * | 12/2001 | Kim | ............................. 348/565 |

* cited by examiner

Primary Examiner—Khai Tran
(74) Attorney, Agent, or Firm—Jay H. Maioli

(57) ABSTRACT

A reception circuit 10 for receiving an analog broadcast and outputting an audio signal based on the analog broadcast includes a digital demodulation circuit 28 for digitally demodulating an intermediate frequency signal obtained in the reception circuit 10 at the reception time of the digital broadcast is and outputting the audio signal based on the digital broadcast, a control circuit 34 for controlling the operating power source voltage of the digital demodulation circuit 28, a detection circuit 31 for detecting the reception of the analog broadcast, and a detection circuit 32 for detecting the reception of the digital broadcast. only when the detection circuit 31 detects the broadcast wave signal of the analog broadcast at the station-selection time and the detection circuit 32 detects the broadcast wave signal of the digital broadcast, the operating power source voltage supplied to the digital demodulation circuit 28 by the control circuit 34.

5 Claims, 5 Drawing Sheets

RECEIVER

BACKGROUND OF THE INVENTION

1. Field of the Invention

The present invention relates to a receiver for a broadcast system in which analog broadcast signals and digital broadcast are broadcast signals in adjacent frequency bands.

2. Description of the Related Art

In the present AM broadcast and the FM broadcast, the processing of elements to be broadcast is being digitized, however, the broadcast itself is based on an analog system. However, if the broadcast is digitized, an additive data service such as supply of broadcast having high sound quality can be performed. The movement of the digitalization of the broadcast itself is being activated because of enhancement of a frequency using efficiency, etc.

However, in order to receive a digital broadcast, a digital broadcast receiver is necessarily newly required in place of an analog broadcast receiver which has been hitherto used. Therefore, it is required to smoothly shift from the analog broadcast to the digital broadcast with no resistance, and it is also required that the analog broadcast and the digital broadcast are allowed to coexist during the shift period.

A broadcast system of enabling the coexistence is generally called as "IBOC (In Band On Channel) system", and the coexistence of the analog broadcast and the digital broadcast can be implemented by setting the analog broadcast and the digital broadcast in such a frequency arrangement as shown in FIG. 1A, for example.

That is, in FIG. 1A, reference character SA represents a broadcast wave signal (FM signal) of the hitherto-used analog FM broadcast, and the carrier frequency thereof is represented by fRX. When the broadcast wave signal of the digital broadcast is allowed to coexist with the analog broadcast wave signal SA, the broadcast wave signals SD, SD of the digital broadcast are disposed so as to be adjacent to both ends of the frequency band of the broadcast wave signal SA.

However, in this case, only any one of the broadcast wave signals SD, SD may be provided. Further, the program content based on the broadcast wave signal SD is generally set to be identical to the program content based on the analog broadcast wave signal SA. Further, in the future, the analog broadcast wave signal SA will be stopped to perform the broadcast with only the digital broadcast wave signal SD, or the broadcast wave signal SA will be used for the digital broadcast. The shift from the analog broadcast to the digital broad is estimated to be established over ten years to fifteen years.

Accordingly, when a listener supports the above coexistence, the listener needs a receiver being operatable before and after the shift period, or a receiver for both the broadcasts which can receive the analog broadcast and the digital broadcast.

SUMMARY OF THE INVENTION

The present invention aims to enable reception of digital broadcast wave signals without making a great modification to a hitherto-used reception circuit for receiving analog broadcast wave signals, and also to suppress undesired power consumption.

Therefore, according to the present invention, there is provided a receiver for a broadcasting system in which the broadcast wave signal of an analog broadcast and the broadcast wave signal of a digital broadcast are broadcast in adjacent frequency bands, characterized by comprising:

a reception circuit for receiving the broadcast wave signal of the analog broadcast and outputting an audio signal based on the analog broadcast;

a digital demodulation circuit for digitally demodulating an intermediate frequency signal obtained in the reception circuit when the broadcast wave signal of the digital broadcast is received, and outputting an audio signal based on the digital broadcast;

a first detection circuit for detecting that the broadcast wave signal of the analog broadcast is received;

a second detection circuit for detecting that the broadcast wave signal of the digital broadcast is received; and a control circuit for controlling supply of an operating power source voltage to the digital demodulation circuit, wherein the digital demodulation circuit is supplied with the operating power source voltage by the control circuit only when the first detection circuit detects the broadcast wave signal of the analog broadcast and the second detection circuit detects the broadcast wave signal of the digital broadcast at a station-selection time.

In the above receiver, each of the first and second detection circuit may include a circuit for detecting whether the reception is performed at a signal intensity above a predetermined level.

The above receiver may further include display means which is turned on to indicate that the broadcast wave signal of the analog broadcast or the broadcast wave signal of the digital broadcast is received, wherein the turn-on state of the display means is made different between when the broadcast wave signal of the analog broadcast is received and when the broadcast wave signal of the digital broadcast is received.

The above receiver may further include display means which is turned on to indicate that the broadcast wave signal of the analog broadcast or the broadcast wave signal of the digital broadcast is received, wherein the turn-on state of the display means is made different in accordance with whether the broadcast wave signal of the digital broadcast is received or not.

The above receiver may further include display means which is turned on to indicate that the broadcast wave signal of the analog broadcast or the broadcast wave signal of the digital broadcast is received, wherein the turn-on state of the display means is made different on the basis of the output of the first detection circuit and the output of the second detection circuit.

According to the present invention, there is also provided a receiver for a broadcasting system in which the broadcast wave signal of an analog broadcast and the broadcast wave signal of a digital broadcast are broadcast in adjacent frequency bands, characterized by comprising:

a reception circuit for receiving the broadcast wave signal of the analog broadcast and outputting an audio signal based on the analog broadcast;

a digital demodulation circuit for digitally demodulating an intermediate frequency signal obtained in the reception circuit when the broadcast wave signal of the digital broadcast is received, and outputting an audio signal based on the digital broadcast;

a first detection circuit for detecting that the broadcast wave signal of the analog broadcast is received;

a second detection circuit for detecting that the broadcast wave signal of the digital broadcast is received; and a control circuit for controlling the supply of an operating power source voltage to the digital demodulation circuit, wherein the digital demodulation circuit is provided with a synchronous flag for representing establishment of synchronization when the synchronization is established in the digital demodulation circuit; the digital demodulation circuit is supplied with the operating power source voltage by the control circuit when the first detection circuit detects the broadcast wave signal of the analog broadcast and the second detection circuit detects the broadcast wave signal of the digital broadcast at a station-selection time; and the supply of the operating power source voltage to the digital demodulation circuit is continued when the synchronous flag indicates it within a predetermined time from the supply of the operating power source voltage that the synchronization is established in the digital demodulation circuit, and the supply of the operating power source voltage to the digital demodulation circuit is stopped when the synchronous flag does not indicate that the synchronization is established in the digital demodulation circuit.

Accordingly, the power is consumed in the digital processing circuit only when the digital broadcast is received.

DETAILED DESCRIPTION OF THE PREFERRED EMBODIMENT

A preferred embodiment according to the present invention will be described hereunder with reference to the accompanying drawings.

Figure 2:
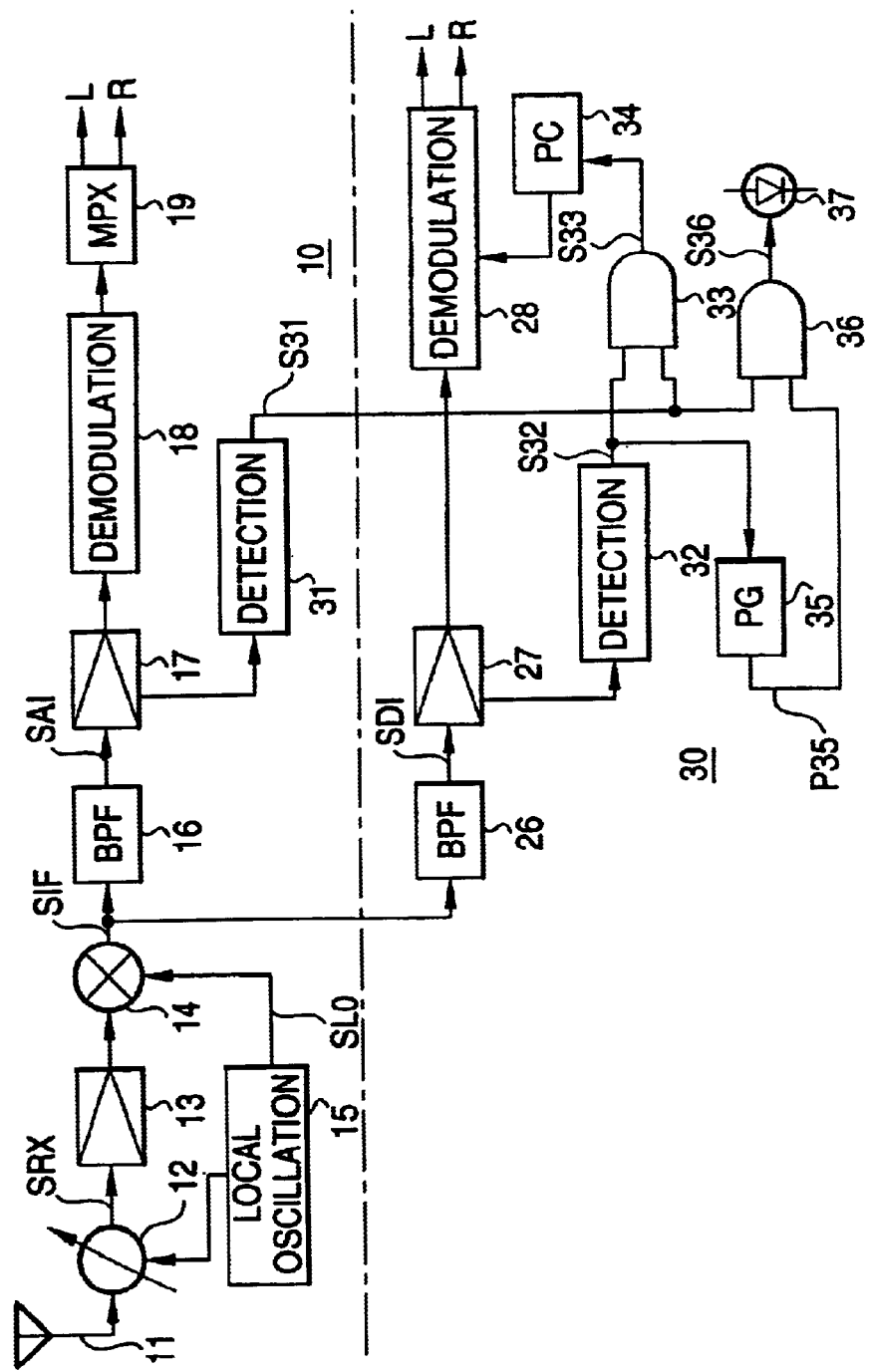
FIG. 2 is a systematic diagram showing an embodiment of the present invention.

In FIG. 2, a part 10 above a chain line represents a hitherto-used analog-broadcast reception circuit, and most of the reception circuit 10 is integrated into one chip. Further, the reception circuit 10 is used to receive FM broadcast, for example.

At the reception time of an analog broadcast, the broadcast wave signal of the analog broadcast received by an antenna 11 is supplied to an antenna tuning circuit 12 of an electronic tuning system to select and pick up a reception signal SRX of targeted frequency fRX, and the reception signal is supplied through a radio frequency amplifier 13 to a mixer circuit 14.

Further, a local oscillation circuit 15 is composed of PLL to form a local oscillation signal SLO whose frequency is far away from the reception frequency fRX by an intermediate frequency fIF, and this signal SLO is supplied to the mixer circuit 14. At this time, a part of a control voltage supplied to VCO (not shown) of PLL constituting the local oscillation circuit 15 is supplied as a station-selection voltage to the antenna tuning circuit 12.

As described above, the reception signal SRX is frequency-converted to the intermediate frequency signal SIF (intermediate frequency fIF). In this case, when the reception signal SRX is a coexistence type broadcast wave signal shown in FIG. 1A, the intermediate frequency signal SIF has, at the position of the intermediate frequency fIF, an intermediate frequency signal SAI which is obtained by frequency-converting the broadcast wave signal SA of the analog broadcast, and also has, at both the sides (or at the one side) thereof, an intermediate frequency signal SDI which is obtained by frequency-converting the broadcast wave signal SD of the digital broadcast. When the reception signal SRX is a broadcast wave signal SA of the analog broadcast, the intermediate frequency signal SIF has only the intermediate frequency signal SAI.

The intermediate frequency signal SIF is supplied to a band pass filter 16 to pick up the intermediate frequency signal SAI of the analog broadcast, the signal SAI is supplied through an amplifier 17 to an FM demodulation circuit 18 to demodulate a stereo composite signal, and this signal is supplied to a stereo demodulation circuit 19 to pick up audio signals L and R of left and right channels. In the reception circuit 10, the reception of the analog broadcast wave signal is performed as described above.

Figure 1A:
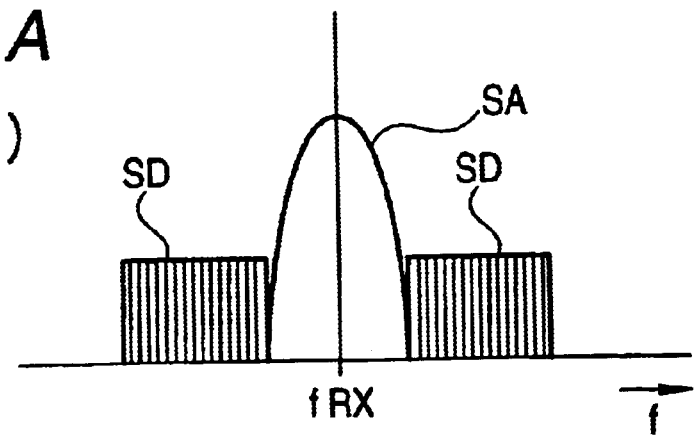
FIGS. 1A to 1C are frequency spectral diagrams showing an analog broadcast and digital broadcast frequency arrangement.
Figure 1B:
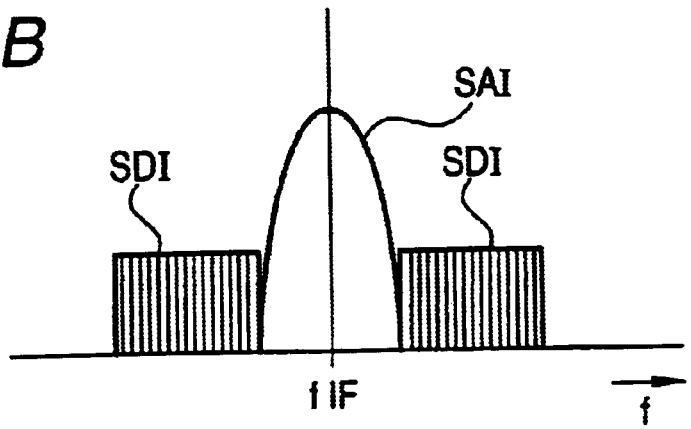

In the present invention, a power-saving/display circuit 30 is constructed as described above. That is, when the reception signal SRX is a coexistenc type broadcast wave signal, the intermediate frequency wave signal SIF shown in FIG. 1B is picked up from the mixer circuit 14, and this signal SIF is supplied to a band pass filter 26 to pick up the intermediate frequency signal SDI of the digital broadcast, and the signal SDI is supplied through am amplifier 27 to a digital demodulation circuit 28. The demodulation circuit 28 executes the signal processing corresponding to the broadcast system of the digital broadcast on the intermediate frequency signal SDI thus supplied to demodulate and output the analog audio signals L, R of the left and right channels.

A part of the intermediate frequency signal SAI in the amplifier 17 is supplied to a level detection circuit 31. When the reception level of the broadcast wave signal SA of the analog broadcast is above a predetermined value, a detection signal S31 having "H" level is picked up, and the signal S31 is supplied to AND circuits 33, 36. Actually, the detection circuit 31 is a tuning display circuit for driving an LED 37 on the basis of the output signal S31 thereof to perform tuning display.

Further, a part of the intermediate frequency signal SDI in the amplifier 27 is supplied to a level detection circuit 32. When the reception level of the broadcast wave signal SD of the digital broadcast is above a predetermined level, a detection signal S32 having "H" level is picked up, and the signal S32 is supplied to the AND circuit 33.

The output signal S33 of the AND circuit 33 is supplied to a power control circuit 34, and when S33="H", the operating power source voltage thereof is supplied from the power control circuit 34 to the digital demodulation circuit 28.

Further, the detection signal S32 of the detection circuit 32 is supplied to a pulse forming circuit 35, a pulse P35 having the following variation behavior is formed, and this pulse P35 is supplied to an AND circuit 36:

for S32="L", the level is fixed to "H" level, and for S32="H", the level is inverted every 0.5 second, for example.

The output signal S36 of the AND circuit 36 is supplied to a display device, for example, an LED 37.

According to the above construction, the following operation is carried out according to the reception signal SRX.

(1) When the reception signal SRX is a broadcast wave signal SA of the analog broadcast In this case, S31="H". Further, S32="L", and thus P35="H". Accordingly, S36="H", so that the LED 37 is continuously turned on.

Further, in this case, S32="L", and thus S33="L". Accordingly, the supply of the operating power source voltage from the power control circuit 34 to the demodulation circuit 28 is stopped. Accordingly, no power is consumed in the demodulation circuit 28.

(2) When the reception signal SRX is a coexistence type broadcast wave signal

In this case, S31="H". Further, S32="H", so that the pulse P35 is inverted every 0.5 second, for example. Accordingly, the signal S36 is inverted in synchronism with the pulse P35, and thus the LED 37 is intermittently turned on, that is, it flashes on and off.

Further, in this case, S31="H" and S32="H", so that S33="H". Therefore, the operating power source voltage is supplied from the power control circuit 34 to the demodulation circuit 28. Accordingly, the demodulation circuit 28 executes the demodulation processing thereof, thereby outputting the audio signals L, R based on the digital broadcast from the demodulation circuit 28.

(3) When no broadcast is received

In this case, since S31="L", S36="L", and the LED 37 is turned out.

Further, since S31="L" and S32="L", S33="L" and thus no operating power source voltage is supplied to the demodulation circuit 28.

As described above, according to the receiver, the digital broadcast can be received without making any large modification to the hitherto-used analog broadcast reception circuit 10 by merely adding a circuit below the chain line. In addition, when the broadcast thus received is an analog broadcast, the LED 37 is continuously turned on. For the coexistence type broadcast, the LED 37 flashes on and off, and when no broadcast is received, the LED 37 is turned out.

Therefore, it can be known on the basis of the turn-on state of the LED 37 whether the broadcast is received, and if it is received, it can be also known whether the broadcast is an analog broadcast or a coexistence type broadcast (digital broadcast).

Since the operating power source voltage is supplied to the digital demodulation circuit 28 only when the broadcast received contains the digital broadcast, extra power consumption can be suppressed. That is, the power consumption of an analog broadcast receiver is equal to about 30 mW. On the other hand, the power consumption of the digital broadcast receiver is equal to about 1W and it corresponds to about 30 times as high as the power consumption of the analog broadcast receiver. Therefore, if the operating power source voltage is supplied to the digital demodulation circuit 28 at all times in a receiver which can receive the analog broadcast and the digital broadcast, large power is consumed even when the analog broadcast is received.

However, in the above-described receiver, when the analog broadcast is received, the supply of the operating power source voltage to the digital demodulation circuit 28 is stopped, so that extra power consumption can be suppressed.

Further, since the operation of the digital demodulation circuit 28 is stopped at the station-selection time, any noise signal occurring in the digital demodulation circuit 28 does not disturb the station-selection operation and the detection of the reception level, and it can be surely identified whether the digital broadcast wave signal is received.

Figure 3:
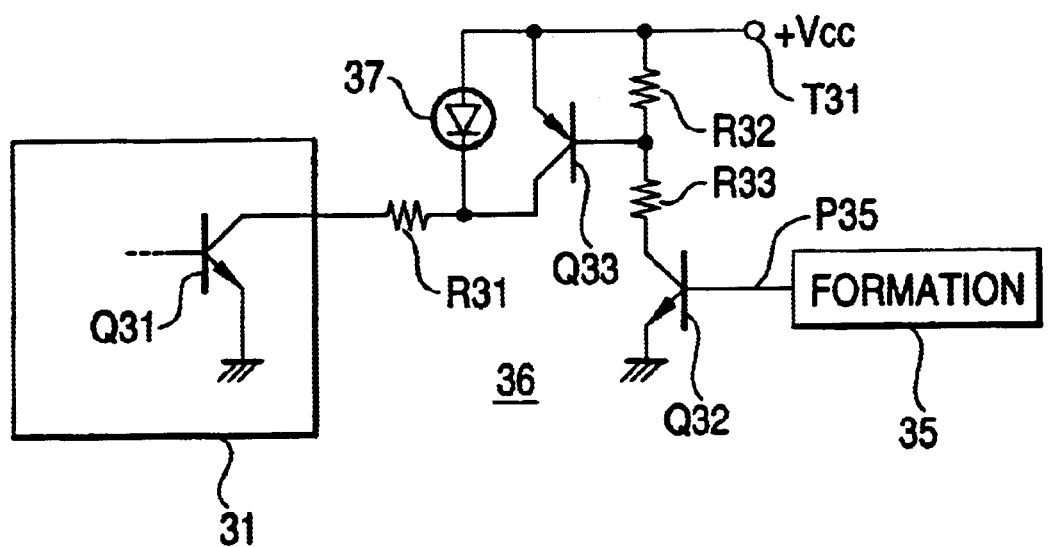
FIG. 3 is a connection diagram showing an embodiment of the present invention.

FIG. 3 shows an embodiment of the AND circuit 36. That is, a transistor Q31 at the last stage of the detection circuit 31 is set as an open collector, and a current restricting resistor R31 and an LED 37 are connected in series between the collector and a power source terminal T31. It is assumed that when the reception level of the broadcast wave signal SA of an analog broadcast is above a predetermined value, the transistor Q31 is switched on. Further, when the reception circuit 10 is used for a receiver which receives only the analog broadcast, the tuning display is carried out by the above connection.

Further, the output terminal of the pulse forming circuit 35 is connected to the base of a transistor Q32, and the emitter of the transistor Q33 is connected to the ground. The collector thereof is connected to the power source terminal T31 through resistors R33, R32. The intermediate point between the resistors R32, R33 is connected to the base of the transistor Q33, and the emitter and the collector thereof are connected to the LED 37 in parallel. The output signal P35 of the forming circuit 35 is set as follows:

for S32="L", the output signal P35 is fixed to "L" level, and for S32="H", the output signal P35 is inverted every 0.5 second.

According to the above construction, (1) when the reception signal SRX is the broadcast wave signal SA of the analog broadcast In this case, S32="L" and thus P35="L". Therefore, the transistor Q32 is switched off, and thus the transistor Q33 is also switched off. Further, at this time, the transistor Q31 is switched on by receiving the analog broadcast wave signal.

Accordingly, the LED 37 is continuously turned on.

(2) When the reception signal SRX is a coexistence type broadcast wave signal

In this case, since S32="H", the pulse P35 is inverted every 0.5 second, and thus the transistor Q33 is switched on/off in accordance with the inversion of the pulse P35. At this time, since the analog broadcast is received, the transistor Q31 is switched on. Accordingly, the LED 37 flashes on and off in synchronism with the pulse P35.

(3) When no broadcast is received

In this case, since the transistor Q31 is off, the LED 37 goes out.

Accordingly, it can be known on the basis of the state of the LED 37 whether the broadcast is received, and if it is received, it can be also known whether the broadcast is an analog broadcast or coexistence type broadcast.

Figure 4:
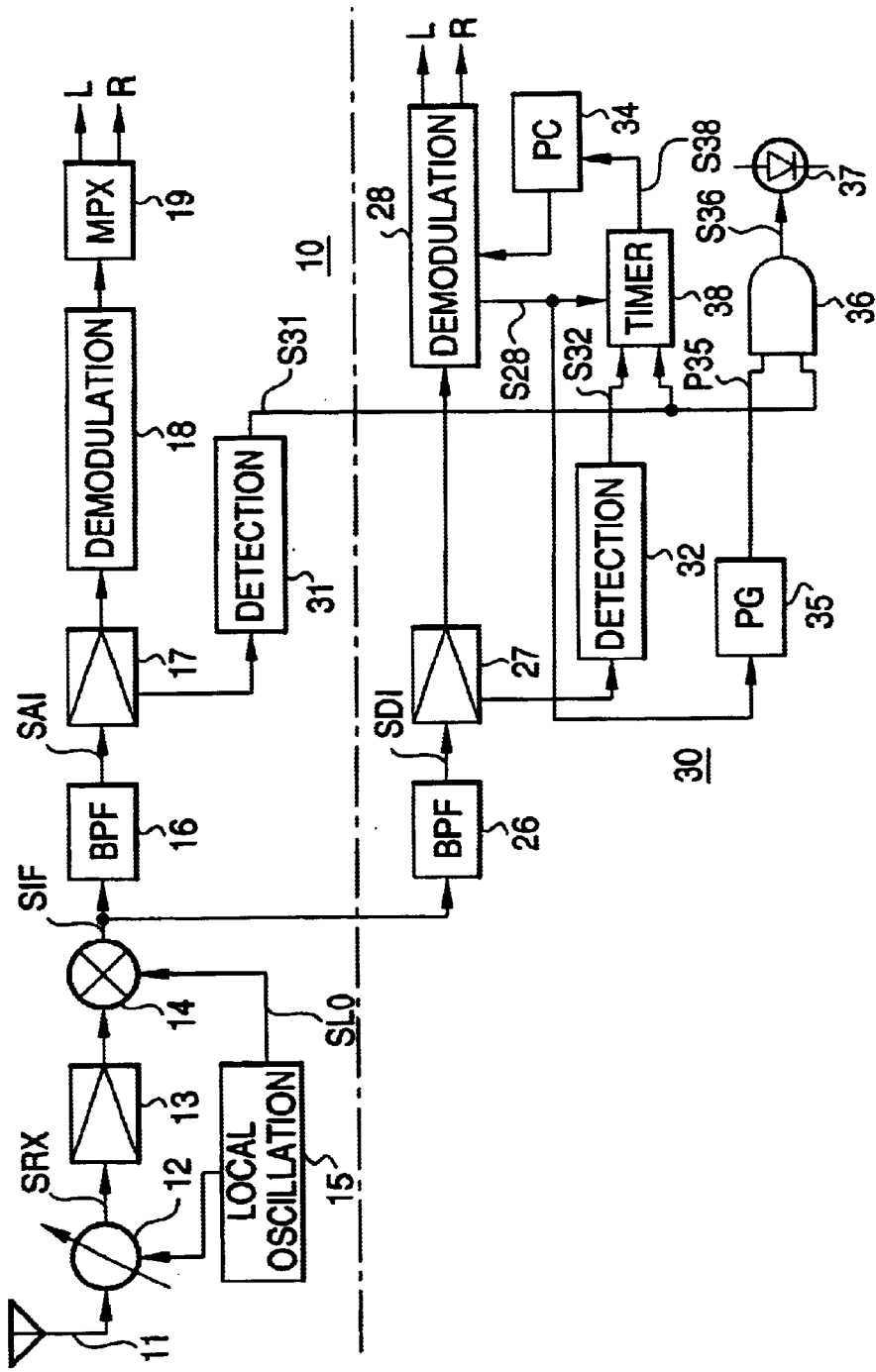
FIG. 4 is a systematic diagram showing an embodiment of the present invention.

In the receiver shown in FIG. 4, it can be more surely identified whether the digital broadcast wave signal is received. That is, the reception circuit 10 and the demodulation systems 26 to 28 for the digital broadcast are constructed as described with reference to FIG. 2, however, a timer circuit 38 is provided in place of the AND circuit 33.

The timer circuit 38 is supplied with detection signals S31, S32 of the detection circuits 31, 32 as trigger input, and the timer circuit 38 is triggered when both of the signals S31, S32 are set to "H". The timer circuit 38 is designed so that the output signal S38 thereof is set to "H" level during a predetermined time τ from the time when the timer circuit 38 is triggered, for example, during about τ=1 second.

Further, a synchronous flag S28 representing whether the synchronization of the digital processing in the demodulation circuit 28 is established from the demodulation circuit 28, and if the synchronization is established, a synchronous flag S28 of "H" level is picked up. This flag S28 is supplied to the timer circuit 38, and for S28="H", the state of S38="H" is held.

The output signal S38 is supplied to the power control circuit 34, and for S38="H", the operating power source voltage thereof is supplied from the power control circuit 34 to the digital demodulation circuit 28. Further, in place of the detection signal S32, the synchronous flag S28 is supplied to the pulse forming circuit 35.

According to the above construction, when a broadcast is received, the following operation is carried out according to the broadcast thus received.

(1) When an analog broadcast wave signal is received

In this case, since S32="L", the timer circuit 38 is not triggered, and S38="L" is kept. Accordingly, no operating power source voltage is supplied from the power control circuit 34 to the demodulation circuit 28. Therefore, no power is consumed in the demodulation circuit 28.

Since no operating power source voltage is supplied to the demodulation circuit 28, S28="L" and thus P35="H". Further, since the analog broadcast wave signal is received, S31="H". Accordingly, S36="H", and thus the LED 37 is continuously turned on.

(2) When a coexistence type broadcast wave signal is received

In this case, when a broadcast is received, S31="H", and S32="H". Therefore, the timer circuit 38 is triggered, and S38="H". Accordingly, the operating power source voltage is supplied from the power control circuit 34 to the demodulation circuit 28, and the demodulation circuit 28 executes its demodulation processing.

When a digital broadcast wave signal is normally received, the synchronization is established in the demodulation circuit 28 before the period τ (for example, 1 second) elapses from the time when the timer circuit 38 is triggered, and S28="H" is set.

By the synchronous flag S28, the state of S38="H" is kept during S28="H". Accordingly, the operating power source voltage continues to be supplied to the demodulation circuit 28 even after the period τ, and the demodulation circuit 28 continues to perform the demodulation processing. Therefore, audio signals L, R based on the digital broadcast are output from the demodulation circuit 28.

In this case, since S28="H", the pulse P35 is inverted every 0.5 second. Accordingly, the signal S36 is inverted in synchronism with the pulse P35, so that the LED 37 flashes on and off. On the other hand, when no digital broadcast is normally received, for example when S32 is set to "H" due to a noise signal, no synchronization of the demodulation circuit 28 is established not only during the period τ from the time when the timer circuit 38 is triggered, but also after the period τ, so that the state of S28="L" is still kept. If S28="L", the state is shifted from S38="H" to S38="L" when the period τ elapses.

Accordingly, no operating power source voltage is supplied to the demodulation circuit 28 from the time when the period τ elapses. Therefore, no power is consumed in the demodulation circuit 28.

Further, when the period τ elapses, S28="L", and thus P35="H". At this time, S31="H" , and thus S36="H". Accordingly, the LED 37 is continuously turned on. That is, when the detection signal S32 of the detection circuit 32 shows that the digital broadcast is received, the operating power source voltage is first supplied to the demodulation circuit 28 during the time τ to check whether the synchronization of the demodulation circuit 28 is established. If the synchronization is established, it is judged that the audio signals L, R of the digital broadcast can be normally demodulated, and the demodulation circuit 28 is subsequently operated. Further, the LED 37 flashes on and off to let the listener to know that the digital broadcast can be received.

However, if the synchronization is not established as a result of the check on the establishment of the synchronization, it is judged that the audio signals L, R of the digital broadcast cannot be normally demodulated, and the subsequent demodulation circuit 28 is powered off. Further, the LED 37 is continuously turned on to inform that the reception for the analog broadcast is allowed.

(3) When no broadcast is received

In this case, since S31="L", S38="L", and no operating power source voltage is supplied to the demodulation circuit 28. Further, S31="L", S36="L", and the LED 37 is turned out.

As described above, according to the receiver, it is checked whether the synchronization of the digital demodulation circuit 28 is established. Only when the synchronization is established, the supply of the operating power source voltage to the demodulation circuit 28 is carried out to operate the demodulation circuit 28, and the LED 37 is displayed to flash on and off. Accordingly, it can be more surely identified whether t he digital broadcast wave signal is received.

Further, when the digital broadcast wave signal is not normally received, the operating power source voltage is supplied to the demodulation circuit 28 during only the period needed for the identification (that is, the period τ). Therefore, extra power consumption can be surely suppressed.

Figure 5:
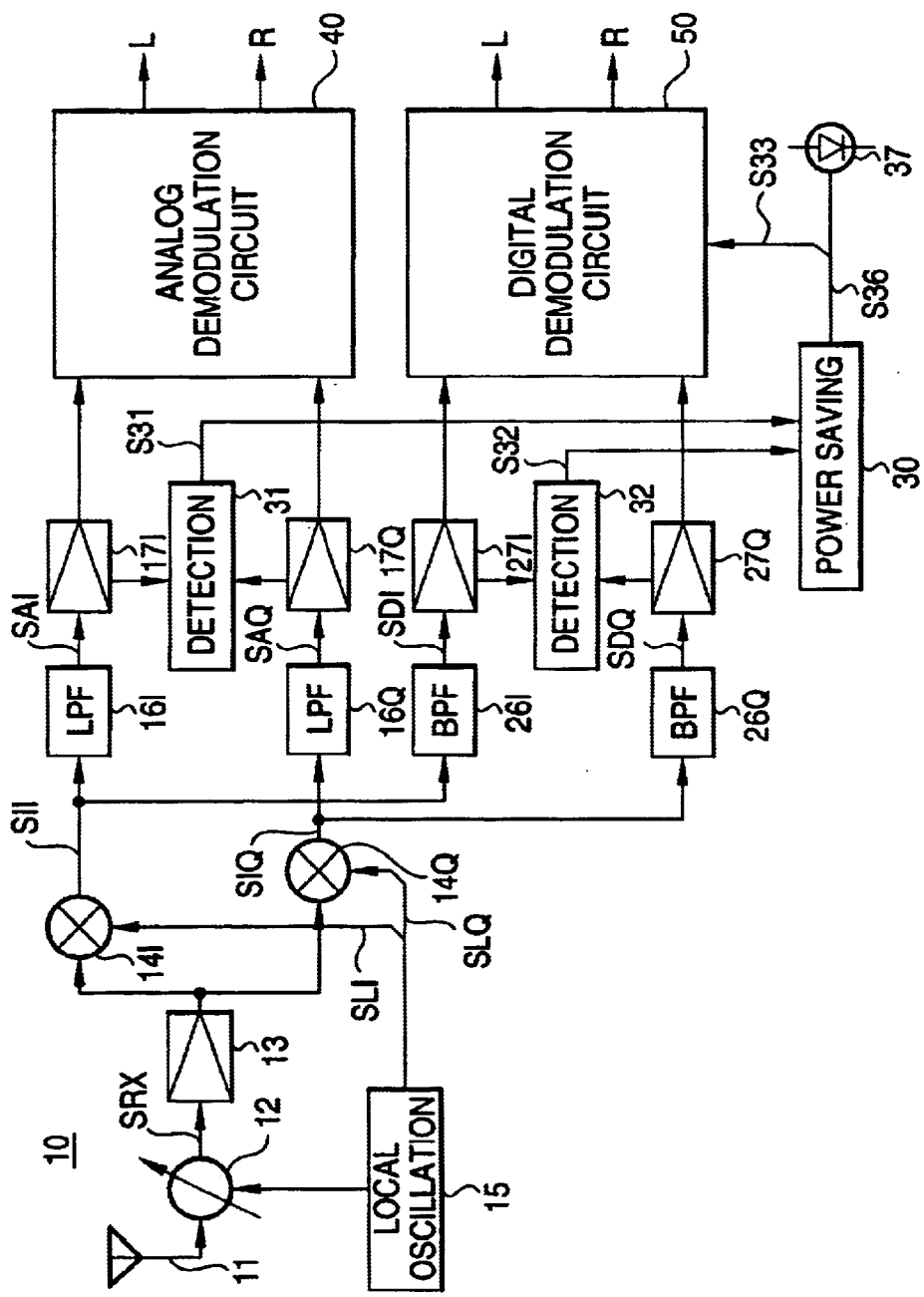
FIG. 5 is a systematic diagram showing an embodiment of the present invention.

FIG. 5 shows a case where the reception circuit 10 is constructed as a direct conversion type. When the analog broadcast wave signal or digital broadcast wave signal is stationarily received, the reception is carried out as follows.

That is, the broadcast wave signal received by the antenna 11 is supplied to the antenna tuning circuit 12 of the electronic tuning system to select and pick up the reception signal SRX of target frequency fRX, and the signal SRX is supplied through the RF amplifier 13 to the first and second mixer circuits 14I and 14Q.

Further, the local oscillation circuit 15 is constructed by PLL, and local oscillation signals SLI, SLQ which are different in phase by 90° are formed on the basis of an oscillation frequency equal to the reception frequency FRX. These signals SLI, SLQ are supplied to the mixer circuits 14I, 14Q, respectively. At this time, a part of the control voltage supplied to the VCO (not shown) of the PLL constituting the local oscillation circuit 15 is supplied as a station-selection voltage to the antenna tuning circuit 12.

As described above, the reception signal SRX is frequency-converted to the intermediate frequency signals SII, SIQ in the mixer circuits 14I, 14Q, and these signals SII, SIQ are picked up from the mixer circuits 14I, 14Q.

Figure 1C:
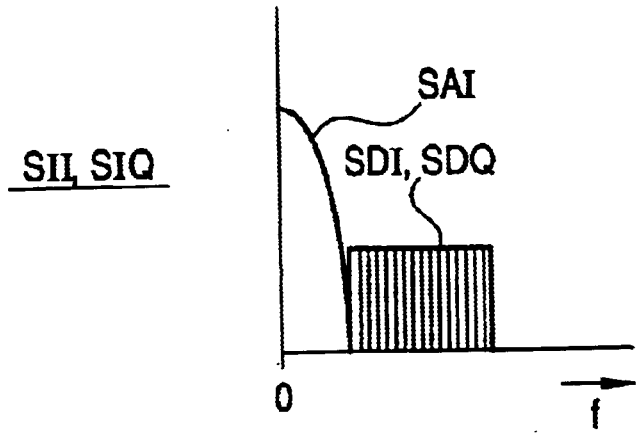

In this case, the frequency of the local oscillation signals SLI, SLQ is equal to the reception frequency fRX. Therefore, when a broadcast shown in FIG. 1A is received, the intermediate frequency signals SII, SIQ have an intermediate frequency of zero, for example, as shown in FIG. 1C, and are provided at the low area side with signals SAI, SAQ to which the analog broadcast wave signal SA is frequency-converted, and also provided at the high area side with signals SDI, SDQ to which the digital broadcast wave signal SD is frequency-converted. At this time, the signals SII, SIQ are different in phase by 900 in connection with the phase of the local oscillation signals SLI, SLQ.

The intermediate frequency signals SII, SIQ are supplied to low pas filters 16I, 16Q to pick up the signals SAI, SAQ from the signals SII, SIQ, and these signals SAI,SAQ are supplied to an analog processing circuit 40 through amplifiers 17I, 17Q. The processing circuit 40 performs phase processing, operation processing, etc. on the signals SAI, SAQ, and also performs stereo demodulation processing on these signals to pick up the audio signals L, R of the analog broadcast from the signals SAI, SAQ.

Further, the intermediate frequency wave signals SII, SIQ from the mixer circuits 14I, 14Q are supplied to band pass filters 26I, 26Q to pick up the signals SDI, SDQ from the signals SII, SIQ, and these signals SDI, SDQ are supplied to the digital processing circuit 50 through amplifiers 27I, 27Q. The processing circuit 50 performs the signal processing corresponding to the broadcast system of the digital broadcast to restore the audio signals L, R from the intermediate frequency signals SDI, SDQ.

Further, the intermediate frequency signals SAI, SAQ in the amplifiers 17I, 17Q are supplied to the level detection circuit 31 to pickup the detection signal S31. The intermediate frequency signals SDI, SDQ in the amplifiers 27I, 27Q are supplied to the level detection circuit 32 to pick up the detection signal S32. These detection signals S31, S32 are used in the power save/display circuit 30 as described on the receiver of FIG. 2 (or FIG. 3).

Accordingly, this receiver can also receive the digital broadcast wave signal without making any great modification to the hitherto-used reception circuit 10 for the analog broadcast wave signals. Further, it can be also known on the basis of the turn-on state of the LED 37 whether the broadcast wave signal thus received is an analog broadcast wave signal or coexistence type broadcast wave signal.

Further, only when the digital broadcast wave signal is contained in the broadcast wave signal received, the operating power source voltage is supplied to the digital demodulation circuit 28, so that extra power consumption can be suppressed. At the station-selection time, the noise signal occurring in the digital processing circuit 28 does not affect the station-selection operation and the detection of the reception level. In addition, it can be surely identified whether the digital broadcast wave signal is received.

In the above description, the power control circuit 34 may be a circuit for suppressing the power consumption of the digital demodulation circuit 28 when the digital broadcast wave signal is not received. Further, the signals S31, S32, S28 may be processed by a microcomputer and software to form the signals S33, S36, S38.

According to the present invention, the digital broadcast wave signal can be received without making any great modification to the hitherto-used reception circuit for the analog broadcast wave signal. In addition, it can be also known on the basis of the turn-on state of the display device whether the broadcast wave signal received is an analog broadcast wave signal or coexistence type broadcast wave signal. The operating power source voltage is supplied to the digital demodulation circuit only when the digital broadcast wave signal is contained in the broadcast wave signal received, and thus extra power consumption can be suppressed.

Further, at the station-selection time, the operation of the digital demodulation circuit is stopped. Therefore, the noise signal occurring in the digital processing circuit does not disturb the station-selection operation and the detection of the reception level. In addition, it can be surely identified whether the digital broadcast wave signal is received. Only when the synchronization of the digital demodulation circuit is established, the demodulation circuit is operated, so that it can be surely identified whether the digital broadcast wave signal is received.

What is claimed is:

1. A receiver for a broadcasting system in which a broadcast wave signal of an analog broadcast and a broadcast wave signal of a digital broadcast are broadcast in adjacent frequency bands, the receiver comprising:

a reception circuit for receiving the broadcast wave signal of the analog broadcast, for receiving the broadcast wave signal of the digital broadcast, for converting the received signal into an intermediate frequency signal, and outputting a first audio signal based on the analog broadcast when the analog wave signal of the analog broadcast is received;

a digital demodulation circuit for digitally demodulating the intermediate frequency signal obtained in said reception circuit when the broadcast wave signal of the digital broadcast is received and when power from a power control circuit is supplied thereto and for outputting a second audio signal based on the digital broadcast;

a first detection circuit for detecting that the broadcast wave signal of the analog broadcast is received based on said intermediate frequency signal obtained in the reception circuit;

a second detection circuit for detecting that the broadcast wave signal of the digital broadcast is received based on said intermediate frequency signal obtained in the reception circuit; and a control circuit for controlling said power control circuit to supply an operating power source voltage to said digital demodulation circuit, wherein said digital demodulation circuit is supplied with the operating power source voltage by said control circuit only when said first detection circuit detects the broadcast wave signal of the analog broadcast while said second detection circuit simultaneously detects the broadcast wave signal of the digital broadcast at a station-selection time, and wherein each of said first detection circuit and said second detection circuit includes a respective circuit for detecting whether reception at the reception circuit is performed on a signal having an intensity above a predetermined level.

2. A receiver for a broadcasting system in which a broadcast wave signal of an analog broadcast and a broadcast wave signal of a digital broadcast are broadcast in adjacent frequency bands, the receiver comprising:

a reception circuit for receiving the broadcast wave signal of the analog broadcast, for receiving the broadcast wave signal of the digital broadcast, for converting the received signal into an intermediate frequency signal, and outputting a first audio signal based on the analog broadcast when the analog wave signal of the analog broadcast is received;

a digital demodulation circuit for digitally demodulating the intermediate frequency signal obtained in said reception circuit when the broadcast wave signal of the digital broadcast is received and when power from a power control circuit is supplied thereto and for outputting a second audio signal based on the digital broadcast;

a first detection circuit for detecting that the broadcast wave signal of the analog broadcast is received based on said intermediate frequency signal obtained in the reception circuit;

a second detection circuit for detecting that the broadcast wave signal of the digital broadcast is received based on said intermediate frequency signal obtained in the reception circuit; and a control circuit for controlling said power control circuit to supply an operating power source voltage to said digital demodulation circuit, wherein said digital demodulation circuit is supplied with the operating power source voltage by said control circuit only when said first detection circuit detects the broadcast wave signal of the analog broadcast while said second detection circuit simultaneously detects the broadcast wave signal of the digital broadcast at a station-selection time, and further comprising display means turned on to indicate that the broadcast wave signal of the analog broadcast or the broadcast wave signal of the digital broadcast is received at the reception circuit, wherein a turn-on state of said display means is different when the broadcast wave signal of the analog broadcast is received than when the broadcast wave signal of the digital broadcast is received.

3. A receiver for a broadcasting system in which a broadcast wave signal of an analog broadcast and a broadcast wave signal of a digital broadcast are broadcast in adjacent frequency bands, the receiver comprising:

a reception circuit for receiving the broadcast wave signal of the analog broadcast, for receiving the broadcast wave signal of the digital broadcast, for converting the received signal into an intermediate frequency signal, and outputting a first audio signal based on the analog broadcast when the analog wave signal of the analog broadcast is received;

a digital demodulation circuit for digitally demodulating the intermediate frequency signal obtained in said reception circuit when the broadcast wave signal of the digital broadcast is received and when power from a power control circuit is supplied thereto and for outputting a second audio signal based on the digital broadcast;

a first detection circuit for detecting that the broadcast wave signal of the analog broadcast is received based on said intermediate frequency signal obtained in the reception circuit;

a second detection circuit for detecting that the broadcast wave signal of the digital broadcast is received based on said intermediate frequency signal obtained in the reception circuit; and a control circuit for controlling said power control circuit to supply an operating power source voltage to said digital demodulation circuit, wherein said digital demodulation circuit is supplied with the operating power source voltage by said control circuit only when said first detection circuit detects the broadcast wave signal of the analog broadcast while said second detection circuit simultaneously detects the broadcast wave signal of the digital broadcast at a station-selection time, and further comprising display means turned on to indicate that one of the broadcast wave signal of the analog broadcast and the broadcast wave signal of the digital broadcast is received at the reception circuit, wherein a turn-on state of said display means is different in accordance with whether the broadcast wave signal of the digital broadcast is received.

4. A receiver for a broadcasting system in which a broadcast wave signal of an analog broadcast and a broadcast wave signal of a digital broadcast are broadcast in adjacent frequency bands, the receiver comprising:

a reception circuit for receiving the broadcast wave signal of the analog broadcast, for receiving the broadcast wave signal of the digital broadcast, for converting the received signal into an intermediate frequency signal, and outputting a first audio signal based on the analog broadcast when the analog wave signal of the analog broadcast is received;

a digital demodulation circuit for digitally demodulating the intermediate frequency signal obtained in said reception circuit when the broadcast wave signal of the digital broadcast is received and when power from a power control circuit is supplied thereto and for outputting a second audio signal based on the digital broadcast;

a first detection circuit for detecting that the broadcast wave signal of the analog broadcast is received based on said intermediate frequency signal obtained in the reception circuit;

a second detection circuit for detecting that the broadcast wave signal of the digital broadcast is received based on said intermediate frequency signal obtained in the reception circuit; and a control circuit for controlling said power control circuit to supply an operating power source voltage to said digital demodulation circuit, wherein said digital demodulation circuit is supplied with the operating power source voltage by said control circuit only when said first detection circuit detects the broadcast wave signal of the analog broadcast while said second detection circuit simultaneously detects the broadcast wave signal of the digital broadcast at a station-selection time, and further comprising display means turned on to indicate that the broadcast wave signal of the analog broadcast or the broadcast wave signal of the digital broadcast is received at the reception circuit, wherein a turn-on state of said display means is different on the basis of an output of said first detection circuit and an output of said second detection circuit.

5. A receiver for a broadcasting system in which a broadcast wave signal of an analog broadcast and a broadcast wave signal of a digital broadcast are broadcast in adjacent frequency bands, comprising:

a reception circuit for receiving the broadcast wave signal of the analog broadcast, for receiving the broadcast wave signal of the digital broadcast, for producing an intermediate frequency signal, and outputting a first audio signal based on the analog broadcast;

a digital demodulation circuit for digitally demodulating the intermediate frequency signal obtained in said reception circuit when the broadcast wave signal of the digital broadcast is received and outputting a second audio signal based on the digital broadcast;

a first detection circuit for detecting that the broadcast wave signal of the analog broadcast is received at the reception circuit;

a second detection circuit for detecting that the broadcast wave signal of the digital broadcast is received at the reception circuit; and a control circuit for controlling a supply of an operating power source voltage to said digital demodulation circuit, wherein said digital demodulation circuit is provided with a synchronous flag for representing establishment of synchronization when synchronization is established in said digital demodulation circuit, wherein said digital demodulation circuit is supplied with the operating power source voltage by said control circuit when said first detection circuit detects the broadcast wave signal of the analog broadcast and said second detection circuit detects the broadcast wave signal of the digital broadcast at a station-selection time, and wherein the supply of the operating power source voltage to said digital demodulation circuit is continued when the synchronous flag indicates, within a predetermined time from the supply of the operating power source voltage, that the synchronization is established in said digital demodulation circuit, and the supply of the operating power source voltage to said digital demodulation circuit is stopped when the synchronous flag does not indicate that the synchronization is established in said digital demodulation circuit.

* * * * *